United States Patent [19]

Ouderkirk et al.

[11] Patent Number: 5,389,195
[45] Date of Patent: Feb. 14, 1995

[54] SURFACE MODIFICATION BY ACCELERATED PLASMA OR IONS

[75] Inventors: Andrew J. Ouderkirk, Woodbury; Douglas S. Dunn, Maplewood; Edward C. Yu, St. Paul; Susan N. Bohlke, Woodbury, all of Minn.

[73] Assignee: Minnesota Mining and Manufacturing Company, St. Paul, Minn.

[21] Appl. No.: 665,692

[22] Filed: Mar. 7, 1991

[51] Int. Cl.⁶ .............................................. H01L 21/00
[52] U.S. Cl. ..................................... 156/643; 156/668; 156/656; 148/525; 148/900; 427/532; 427/535; 427/524; 427/525; 427/526; 427/527
[58] Field of Search ................. 148/525, 900; 427/34, 427/38, 40, 41; 204/192.34; 156/643, 668, 656; 250/492.3

[56] References Cited

U.S. PATENT DOCUMENTS

| | | | |
|---|---|---|---|
| 4,199,650 | 4/1980 | Mirtich et al. | 428/421 |
| 4,382,186 | 5/1983 | Denholm et al. | 437/173 |
| 4,491,605 | 1/1985 | Mazurek et al. | 427/38 |
| 4,568,563 | 2/1986 | Jackson et al. | 427/40 |
| 4,568,598 | 2/1986 | Bilkadi et al. | 428/141 |
| 4,724,219 | 2/1988 | Ridinger | 437/173 |
| 4,743,493 | 5/1988 | Sioshansi et al. | 428/217 |
| 4,764,394 | 8/1988 | Conrad | 427/38 |
| 4,822,451 | 4/1989 | Ouderkirk et al. | 156/643 |
| 4,912,731 | 3/1990 | Nardi | 376/145 |
| 4,957,771 | 9/1990 | Enloe | 427/38 |
| 5,091,626 | 2/1992 | Lewis et al. | 219/121.69 |
| 5,178,726 | 1/1993 | Yu et al. | 156/643 |

FOREIGN PATENT DOCUMENTS

| | | |
|---|---|---|
| 0033685 | 12/1981 | European Pat. Off. |
| 0206145 | 12/1986 | European Pat. Off. |
| 0287216 | 10/1988 | European Pat. Off. |
| 63-093309 | 4/1988 | Japan . |
| 01149965 | 6/1989 | Japan . |
| 02259063 | 10/1990 | Japan . |
| 2071673 | 9/1981 | United Kingdom . |
| 2105729 | 3/1983 | United Kingdom . |
| 8504983 | 11/1985 | WIPO . |
| 8701120 | 2/1987 | WIPO . |

OTHER PUBLICATIONS

"Electrical Conductivity of Polyethylene Terephthalate Under the Action of Low-Energy Electrons", Polymer Science (USSR); vol. 24; No. 1; Tyutner et al.; abstract only.

"Nitrogen Implantation of AISI 304 Stainless Steel With a Coaxial Plasma Gun", J. Feugeas et al., J. Appl. Phys. 64(5) 1 Sep. 1988, pp. 2648-2651.

"Preparation and Characteristics of ZnS Thin Films by Intense Pulsed Ion Beam", Y. Shimotori et al., J. Appl. Phys. 63(3) 1 Feb. 1988, pp. 968-970.

General Dynamics Astronautics Final Contract Report NAS-5-1139, May 15, 1962, "The Use of a Coaxial Gun for Plasma Propulsion".

"Comparative Status of Pulsed Ion Implantation", J. Gyulai et al., Nuclear Instruments and Methods in Phys. Res., pp. 275-279 (1989).

"Deposition of Wurtzite Type Boron Nitride Layers by Reactive Pulse Plasma Crystallization", M. Sokolowski, Journal of Crystal Growth 46 (1979) pp. 136-138.

*Primary Examiner*—Robert Kunemund
*Assistant Examiner*—George Goudreau
*Attorney, Agent, or Firm*—Gary L. Griswold; Walter N. Kirn; Mark A. Litman

[57] ABSTRACT

The present invention is a surface modification process which provides a means of rapidly heating a thin layer of a polymer surface or a thin coating of material on a coated substrate and various surfaces produced by such a process.

38 Claims, No Drawings

SURFACE MODIFICATION BY ACCELERATED PLASMA OR IONS

BACKGROUND OF THE INVENTION

The idea of a large metal mass accelerator often called an electromagnetic launcher (EML) was demonstrated in the late 1800's and utilized the repulsion between two current carrying loops. This type of launcher is still used to illustrate the electromagnetic repulsion phenomena in basic physics classes today. The use of these EML's as guns was shown around the turn of the century and consisted of multiple coil solenoidal accelerators and laminated iron projectiles. Numerous attempts to produce large solid projectile guns with this method failed because of the difficulty of generating and switching the large amounts of power required.

Another class of known EML's used to accelerate projectiles is the rail gun. This apparatus consists of two parallel conducting rails with a sliding conductor. The projectile is placed perpendicular to, and in contact with, the rails. A current, passing from one rail through the sliding conductor and then through the second rail, generates a magnetic field which acts on the sliding conductor to push and accelerate it along the rails.

This apparatus requires high current levels and suffers from sliding conductor problems, as the metal to metal contact is not reliable and leads to severe arcing. The next advancement to the railgun was to use a plasma. This replaced the sliding metal contact and propelled the projectile. Modern railgun research has been principally in this area.

A relatively recent improvement to the railgun is the coaxial plasma gun. Coaxial electrodes utilizing high energy capacitive discharges have existed since the early 1960's. Such devices, usually operated at a reduced atmosphere, use a static gas prefill or a "puffed" gas as the working material to generate the plasma. Energy, in for example a capacitor bank, is connected across the electrodes, causes the gas to breakdown, and forms a highly ionized plasma which is accelerated down the gun by the resulting Lorentz forces. Such electromagnetic plasma accelerators were intensively developed in the 1960's, principally for two applications: propulsion and nuclear fusion. The goal of this work was to efficiently produce high velocity pulsed plasma. Prefill gas systems lead to dense plasma focus which is useful for fusion applications. Puffed gas systems produce a directed slug of plasma and are useful in space thruster applications. Development has continued in these areas with added applications for high power switches and as a source of x-rays, ions, and electrons.

A. Feugeas, et al, "Nitrogen Implantation of AISI 304 Stainless Steel with a Coaxial Plasma Gun", *J. Appl. Phys.* 64, (5), September, 1988, p. 2648, described such a coaxial plasma gun used as an ion implanter, and showed that the resulting implanted stainless steel had better wear properties than the untreated material.

M. Sokolowski, "Deposition of Wurtzite Type Boron Nitride Layers by Reactive Pulse Plasma Crystallization," *J. Crystal Growth*, 46, 1979, p. 136, describes a scientific study on the use of a coaxial plasma generator to crystallize thin layers of boron nitride.

Ion implantation has been used for some time to modify the surface properties of various materials such as metals, polymers, and coatings. The use of directed energetic ion beams to improve adhesion, create texture, enhance wear or scratch resistance, make polymers conductive, and increase optical transmission has been reported. Ion implantation has not been used for improving adhesion by melting an underlying semicrystalline polymer. Ion implantation cross-links or degrades the polymer without melting.

Other surface modification processes are well known. For example E-beam, corona and plasma treatment have been used to increase the adhesion of coatings to surfaces, etch material, and change the chemistry of the surface. These methods, as well as ion implantation, are either continuous or long pulse length processes, their low energy flux results in a low heat transfer rate, and as such they are not appropriate for surface modification as exemplified by the present invention. Most of these treatments affect polymer surfaces in a fairly gross manner, and any thermal modification which takes place, affects the bulk of the polymer and not just the surface. The process of the present invention is an advance over these earlier processes of surface modification because its short pulse length, high fluence, and high intensity allow a thin surface treatment of a material and thus do not affect the bulk physical or chemical properties of the material.

U.S. Pat. No. 4,822,451 (Ouderkirk et al) teaches a process for the surface modification of semi-crystalline polymers wherein said polymers can have predetermined amounts of their surfaces rendered quasi-amorphous by irradiation with high energy pulses, such as for example an excimer laser. This process essentially teaches energy transfer alone (the greatest particle mass being e-beam irradiation).

"Comparative Status of Pulsed Ion Implantation", J. Gyulai and I. Krafcsik, Nuclear Instruments and Methods in Physics Research B37/38 (1989) pp 275–279 describes an experimental exploration of the effects of pulsed ions on doping and annealing of materials. Metals, ceramics and organics are considered as targets for the pulsed ions. Generally at least one thousand pulses were used and the study used primarily boron ions. The work is primarily performed on metal surfaces and semiconductive surfaces, although organic surfaces are generally described.

SUMMARY OF THE INVENTION

The invention is a process for directing pulses of plasma or ions or a scanned beam of plasma or ions including a plasma of high intensity, high fluence ions and charged and neutral particles to impact a thin surface layer of an object, to thus alter the chemistry, crystal morphology, topography, or density of said surface layer, employing plasma generated from a gas, liquid, or solid source. This surface modification process provides a means of rapidly heating a thin layer of polymer surface or a thin coating on a substrate, and it utilizes a pulsed ion or pulsed plasma source. One such source, never before used in this type of process, is referred to as a coaxial plasma gun. Another aspect of the invention is the various surface modifications produced by such a process, and the process of ablating surfaces by the action of such pulses.

DETAILED DESCRIPTION OF THE INVENTION

Pulses or directed (e.g., scanned) beams of plasma or high energy ions may be directed against various surfaces with a variety of beneficial effects. The pulses may be used to ablate or etch various surfaces or writing on surfaces. The pulses may be used to alter the chemistry or physical properties of surfaces, particularly organic surfaces, and more particularly synthetic organic polymeric surfaces. The pulses may alter the crystalline state of semicrystalline polymers and in some polymers may crosslink a surface region of the polymer without the presence of any crosslinking agents. The invention will be described with respect to these and other effects of the pulse projecting processes described herein.

A unique, thin, quasi-amorphous surface layer on a semi-crystalline polymer was described in U.S. Pat. No. 4,879,176 (Ouderkirk et al.), and the process for producing such a surface was described in U.S. Pat. No. 4,822,451 (Ouderkirk et al.). This quasi-amorphous surface layer is formed by radiation of sufficient intensity and energy density and of very short time duration to cause rapid heating of only the surface layer of the polymer. The process of that invention does not teach or suggest the use of coincident mass transfer and energy transfer to effect the formation of the quasi-amorphous zones or areas.

The present invention is a process for treating or altering surfaces, and (on appropriate semicrystalline surfaces) for producing a similar quasi-amorphous surface layer and also for producing other surface modifications to polymers as well as to thin coatings of materials on various substrates. The process utilizes a plasma or ion directing device, especially preferred is a coaxial plasma gun (e.g., railgun) as a source of accelerated plasma generated from a gas, liquid or solid source.

The process of the present invention, with proper control, can be used to etch polymers (or materials on the surface of polymers), melt the surface of polymers, produce the above mentioned quasi-amorphous surface on polymers, crosslink the surface of certain polymers (e.g., especially polyethylene terephthalate and fluorene polyester), add or modify chemistry at and to the surface of polymers, improve adhesion to the surface of polymers, and etch applied coatings or layers from the surface of polymers. It can also be used to sinter organic dispersion coatings, crystallize inorganic coatings, and anneal inorganic coatings on various substrates. The process requires the projection of a plasma having a molecular weight of at least 1 (e.g., H) at the intended surface.

There are two necessary conditions required of the energy source to provide the treatment of the present invention. Both high intensity (high power per unit area) and high energy density are required. These requirements assure that a substantial amount of heat generated in the very thin surface of treatment in a very short time stays in the surface during the short increments of the process, often referred to as a pulse. The effect of these requirements is to concentrate energy into the surface layer. Thermal diffusion, from the thin treatment layer into the bulk, reduces this concentration of energy and makes the process less efficient. It is, therefore, required that only a small amount of heat be dissipated into the bulk during treatment. The more heat that is transferred to the bulk during surface treatment, the less efficient the process becomes until so much heat goes into the bulk that the process no longer works. Because of this requirement, most non-pulsed or long pulse length energy sources such as flame treatment, low to moderate intensity ion implantation, conventional UV lights, corona treaters, sputtering and vapor deposition apparatus, and the like will not work.

High energy pulses of ions or plasmas can be produced by either magnetic or electrostatic accelerators. Within these categories, the following devices can be used as sources for surface thermal modification:
Electrostatic accelerators:
Ion beam accelerators
Magnetically insulated ion diodes
Magnetic accelerators:
Coaxial plasma guns (railguns)
Magnetically assisted plasma shock generators.

Ion Beam Accelerators

Ion beam accelerators consist of a plasma ion source, electrostatic accelerating grids and plates, and beam focusing and scanning optics. Electrostatic accelerators are commonly used to produce low or moderate intensity ion beams, add hence are not normally useful for thermal surface modification. Normal applications of ion beams are for intensity-linear processes such as ion implantation and doping, plus moderate intensity processing such as annealing. The intensity of ion beams can be increased by focusing and 'ion bunching'. This technology is being developed for nuclear fusion. It is believed that high intensity beams have never been publicly used in technical areas described in the present invention.

High intensity pulsed or rapidly scanned ion beams can be used for amorphization, demetallization, and ablative etching. At least 10,000 W/cm$^2$ is required for amorphization of 1 micrometer of semicrystalline polymer. Ablative etching of coatings and polymers requires about 10 times that power density (e.g., $> 10^5$ W/cm$^2$). High intensity ion beams may be used for maskless imaging of polymers and coatings on polymers using the conditions described in this invention.

Magnetically Insulated Ion Diodes

These are well developed devices for producing 50–1000 ns duration ion beams with an ion energy of 50–500,000 keV. This is probably the best alternative to the coaxial plasma gun.

An ion diode is a two electrode device, consisting of a plate and a grid. A plasma is created in the space between the electrodes, and the ions are extracted and accelerated by a high voltage positive pulse that is applied to the grid. A magnetic field is used near the plate to trap electrons, increasing the relative amount of energy transferred to the ions.

There is prior art in the use of ion diodes for ablative deposition (cf. Nuclear Instruments and Methods in Physics Research, "Comparative Status of Pulsed Ion Implantation," J. Gyulai and I. Krafcsik, B37/38 (1989) pp. 275–79). No prior art has been found on applications relevant to the use of ion diodes on polymer films or coatings on polymer films.

Electromagnetically Driven Shock Tubes

This category covers coaxial plasma guns, railguns, and a variety of devices usually used for generating plasma shock waves. The drive mechanism in all of these devices is mutual repulsion between magnetic fields generated by current flow through the electrodes and the plasma.

The devices that will work for our applications are generally known as 'T-tubes', conical shock tubes and magnetically driven surface discharge devices. Like the coaxial plasma gun, these accelerators will drive plasma to very high velocity.

The mechanism of use of these devices will be identical to the operation of the coaxial plasma gun in the present invention.

Coaxial Plasma Gun

Coaxial plasma guns and railguns are well described in the literature such as:

Methods of Experimental Physics. Vol. 9—Part A, 1970, Academic Press

Descriptions of electromagnetically driven shock tubes.

"Nitrogen Implantation of AISI 304 Stainless Steel with a Coaxial Plasma Gun," J. N. Feugeas et al., J. Appl. Phys., Vol. 64 (5), Sep. 1, 1988, pp. 2648-2651

Demonstrated ion implantation for improved hardness of steel.

"Deposition of Wurtzite Type BN Layers by Reactive Pulse Plasma Crystallization," M. Sokolowski, J. of Crystal Growth, Vol. 46 (1979), pp. 136-138

One of a series of papers by this group on growing crystalline thin films of diamond, BN, and $Al_2O_3$ on substrates by either using the electrodes as a source, gas phase chemistry, or modification of a thin film on a substrate.

Ion Diodes

"Comparative Status of Pulsed Ion Implantation," (J. Gyulai et al., supra)

Describes pulsed ion implantation, semiconductor annealing and doping, organic resist hardening, and producing conductive polymers. The processes involved in resist hardening and increased conductivity are not explained in much detail. The closest area to the present invention, resist hardening, required several hundred pulses, and therefore involves much different conditions than the present process for crosslinking.

"Preparation and Characteristics of ZnS Thin Films by Intense Pulsed Ion Beam," Y. Shimotori et al., J. Appl. Phys. Vol. 63 (3), Feb. 1, 1988, pp. 968-970

Demonstrated ablative deposition of ZnS films by ablating a ZnS target with pulsed ions. This has not been demonstrated by a coaxial gun. Deposition with a coaxial gun should be faster and less expensive.

The coaxial plasma gun is the instrument of choice in the present invention and is capable of producing the short pulse width, high intensity, high energy density required for this process. The effective pulse width of the plasma should be in the range of 10 nanoseconds to either 1 millisecond or 100 microseconds to assure rapid thermal excitation of the affected surface layer. The efficiency of the process can be increased by pre-heating the surface to be treated. The intensity of the plasma source should be over 1000 watts/$cm^2$, or better over 100,000 watts/$cm^2$. The energy density of the plasma must be in the range of 1 mJ/$cm^2$ to 1,000 J/$cm^2$ with the lower energy densities achieved by increasing the distance between the gun and the material to be treated or by reducing the gun discharge energy. A general range for the fluence used in the present invention is 1 mJ/$cm^2$ to $10^3$ J/$cm^2$ with an effective pulse duration of 10 nanoseconds to 1 milisecond.

An "effective pulse" can be generated by scanning with a focused beam. By controlling the dwell time of the beam on a given area., the effect of the beam may be the same as a pulse of the fluence range required in the present invention. Repeated effective pulses may be generated on an area by repeated scanning of that area. For many treatments 1 to 5 effective pulses are sufficient, 1 to 10 or 1 to 20 effective pulses may be needed in other treatments and for ablation, 1 to 500 or even 1 to 1000 effective pulses may be necessary.

The coaxial plasma puff gun preferred in the practice of the present invention is conventional in both the electrical and mechanical layout and similar to the one described in A. Feugeas, et al., "Nitrogen Implantation of AISI 304 Stainless Steel with a Coaxial Plasma Gun," J. Appl. Phys. 64, (5), September, 1988, p. 2648. The power to the gun of this invention is provided from a bank of three parallel 33 uF, 10 kV, 20 nH capacitors. These capacitors are connected to the breech of the gun with a parallel plate bus. The gun itself consists of a 1 inch (2.5 cm) diameter copper rod in the center of a 2 inch (5.1 cm), 1/16 inch (0.159 cm) wall copper tube. The two electrodes have equal length of 6 inches (15.24 cm). The gun acts as both the high voltage switch and the accelerator. The process is initiated with a pulse of gas from an electrically driven automotive fuel injector. The gas is provided with a back pressure to the valve of between 20 and 300 psi, and the valve is set to a pulse width of between 0.2 and 10 ms. The longer pulse width is required to initiate discharge at lower capacitor voltages. The gun operates at a background pressure of less than 1 mTorr, typically $2 \times 10^{-4}$ Torr. Generally the pulsing apparati operate at less than 0.8 bar, less than 0.4 bar, and often less than 0.05 bar. The gas pulse is radially distributed by a PTFE disk behind a flange supporting the outer electrode, fills the gap between the two electrodes at the breech of the gun, is ionized by the high field between the electrodes, and begins to discharge the capacitor. The current flowing from the capacitor through the electrodes and the plasma, electromagnetically accelerates the plasma down the barrel formed by the coaxial electrodes. The nominal 1 microsecond duration, 500–1000 J of energy, plasma pulse, leaves the gun at a velocity of about 100,000 m/s, spreads out in an approximate 30° cone with a near Gaussian radial energy profile, and strikes the surface of the material being treated. The plasma transfers energy to the surface, quickly raising the surface temperature, and initiates a range of effects depending on its intensity and energy density. This plasma can originate from solid, liquid, or gaseous material and may be either inert or chemically reactive, depending on the material used to start the plasma discharge as described above. When the accelerated plasma strikes a material, the surface simultaneously experiences high temperatures (>10000 K) and pressures (>10 atmospheres) for several microseconds. This process creates unique structural and or chemical changes in the exposed surface.

The normal application of the coaxial plasma gun for the processes described in this invention requires operation in a vacuum at a pressure of less than $10^{-2}$ torr. If the capacitor is electronically switched or triggered, then pressures up to 600 torr (about 0.8 bar) may be used.

The use of a coaxial plasma gun to treat polymeric surfaces can produce a variety of effects depending on process parameters such as the particular polymer being treated, the energy of the impinging plasma, the chemical reactivity of the plasma, and other physical or chemical process conditions. The variation of conditions allows control over the desired treatment. For example, polymeric surfaces can be etched away, selectively through a mask, by the use of a relatively large amount of energy in the plasma pulse. A lesser energy will melt a thick layer of the surface and cause the polymer to flow. Still lesser energy will create a quasi-amorphous thin layer. Various conditions can cause cross-linking of certain polymeric surfaces, or add chemistry to the surface.

Polymer etching is useful in various applications including multilayer circuit board production, imaging, forming features for light control film and for priming polymer surfaces. Dry etching technology is preferred in these applications because it is capable of producing structures with a high aspect ratio and resolution and with fewer environmental concerns than wet chemical etching techniques. Additionally, wet chemical methods tend to have specific chemistries for different polymers. Dry etching techniques are much less sensitive to polymer chemistry, and the same process can be applied to a wide range of polymers. In the past the greatest limitation of dry etching has been process speed, particularly where large volumes of polymer must be etched. The present inventive process possesses the requirements that many industrial etching processes require; that is, both the capability of dry etching and high process speed. Clear images with resolutions of less than $10^{-4}$ m (a line with a thickness of less than $10^{-4}$ m) may be readily achieved.

It has been found that the rapid thermal processing of the present invention improves the adhesion of coatings to semicrystaline polymers by two mechanisms. The first is that the elimination of crystallinity allows a coating to diffuse into the surface. This effect is substantial in polymers with as little as 5% crystallinity. The second mechanism is thought to be most noticeable in oriented, highly crystalline polymers such as poly(ethylene terephthalate), (PET), and biaxially oriented polypropylene (BOPP). The adhesion in these cases is higher because the amorphous surface is tougher than the oriented, semicrystalline polymer. The increased fracture resistance of the amorphous polymer can increase coating adhesion by 5 to 20 times. There are two important features to mechanism two: 1) the semicrystalline polymer can be amorphized before or after the coating is applied, and 2) unlike most surface modifications for improved adhesion, mechanism two is sometimes partially reversible by thermal treatment.

The present inventive process can also be used to etch away applied coatings, selectively if desired. Thus metallic coatings on polymers can be etched away using either a contacting or non-contacting mask, leaving desirable patterns or printing.

The accelerated coaxial plasma gun can also be used to treat various coatings on any substrate. It is possible to sinter organic dispersion coatings, crystallize inorganic coatings or anneal inorganic coatings by the choice of proper process parameters on substrates of polymers, metals, inorganics or ceramics.

The process of the present invention is thus seen to be a versatile, useful tool for surface modification. Because of the short pulse, high intensity, and high fluence properties of the impinging plasma, heat is delivered to the surface layer faster than heat diffuses into the bulk polymer, leaving the bulk underlying material unaffected.

There are ranges of useful processes in which the present invention may be used. One of the more useful processes involves the formation of patterned images of metal on polymer (or other surfaces). The patterned images may be in the form of decoration or functional design (e.g., circuitry). One process involves the use of the pulses of ions or plasma in an imagewise pattern against a surface comprising a carrier layer and over that a top coat of a metal or inorganic oxide layer. On the top coat layer is a predetermined pattern of an energy absorbing material (e.g., ink, pigment loaded polymer, graphite, etc.). The surface is pulsed with sufficient intensity of ions or plasma to etch (ablate) the metal or inorganic oxide where there is no energy absorbing material present. The pulsed ions or plasma should not be at such an intensity and duration, however, that both the energy absorbing material and the underlying metal or inorganic oxide is completely etched away. The treated surface may be in the form of films, sheets, fibers, particles or bulk articles.

The surface which is to be ablated or etched by the pulsed ions or pulsed plasma may comprise many different materials, both organic and inorganic. Organic materials may be any solid organic such as natural or synthetic polymeric material. Inorganic materials such as ceramics (e.g., $SiO_2$, $TiO_2$, etc.), glasses, metals, composites, layered materials (e.g., metal coated polymers, metal coated ceramics, polymer coated ceramics, etc.), and the like may be used in the practice of the invention.

"Polymers", as used in the present invention, may include both inorganic or organic polymers. Organic polymeric materials include, for example, polyesters (e.g., polyethyleneterephthalate), polyfluorene, polyimide, polyamides, polycarbonates, polyolefins, polyepoxides, polysiloxanes, polyethers, polyetherimides, polysulfones, polyurethanes, polyvinyl resins (e.g., polyvinyl chloride, polyvinylidene chloride, polyvinyl alcohol), fluorinated and/or chlorinated polymers (such as polytetrafluoroethylene), polyvinyl acetals, and other film forming polymers, both natural and synthetic polymers. Inorganic polymers include such materials as glasses and ceramics. Polymers, unless otherwise restricted include both organic and inorganic polymers.

Where the substrate (carrier layer) is a semicrystalline polymer (or polyimide, which displays some semicrystalline characteristics), a similar product may be produced in a different way. The semicrystalline (or polyimide) polymeric substrate may be coated with a layer of metal or inorganic oxide. The coating may be done in any manner as by vapor deposition, sputtering, sol coating, etc. and will generally be at a coating thickness of 1 to 500 nm. The pulsing of ions or plasma in a patterned (imagewise) distribution against the coating layer (of metal or inorganic oxide). The energy and duration of the pulsing must be insufficient to significantly ablate the coating. Preferably there is no ablation at all. However, the energy and duration should be sufficient to create a quasi-amorphous state in the polymer beneath the pulsed areas of the coating (see U.S. Pat. Nos. 4,872,451; 4,868,006; 4,879,176; and 4,902,378 for the definition and qualities of a quasi-amorphous polymer). The creation of the quasi-amorphous areas under the coating changes the strength of adhesion of the coating with respect to areas that have not been rendered quasi-amorphous. The weaker bond areas (where not pulsed) can be selectively stripped from the carrier layer. In general, the effect of the pulsed ions or plasma on semicrystalline materials, within the fluence ranges of the present invention, is to increase adherence to that surface.

A stripping type process can also be performed by first pulsing (with ions or plasma) in a patterned fashion the surface of a semicrystalline or polyimide material (preferably a film, sheet or flat material). This produces quasi-amorphous zones in the pulsed areas with semicrystalling materials and appears to produce a similar effect on polyimides. The metal or inorganic oxide layer may then be deposited over the surface (preferably by a process of atomic or molecular deposition such as vapor deposition or sputtering). Again, the deposited material more strongly bonds to the quasi-amorphous areas. This relative bonding strength may change by as little as a factor of 2.0 or as much as a factor of 12.0 or more. The material deposited onto unpulsed areas may be more readily stripped from the surface (as by the use of an adhesive tape applied to the coating). This leaves a pattern of the coating on the surface which corresponds to the pattern of the pulsing.

These processes leave discernible fingerprints in the final article that can be used to identify which type of process was used to form the final article. Where the pulsed ions or plasma was used to ablate areas of the coating (metal or metal oxide) from a semicrystalline or polyimide carrier layer, quasi-amorphous zones can be found in the areas free of the coating but not in areas where the coating remains in a pattern. This condition exists immediately after the process of forming the article. If the article is subsequently heated or annealed, the quasi-amorphous areas will revert to their semicrystalline state.

If the article is formed by patterned pulsing of the semicrystalline surface, before or after application of the coating, and then subsequent stripping of the coating from non-pulsed areas, the quasi-amorphous regions will be under the coating, but not in the coating free areas. Again, the quasi-amorphous zones can be converted to semicrystalline material by heating or annealing.

Generally, the effects of pulsed ions and plasma within the controlled fluence range of the present invention, can have unique effects upon polyester (e.g., polyethylene terephthalate) and polyfluorene polyester substrates. In addition to formation of quasi-amorphous zones, the pulsed ions and plasma form crosslinked regions on the surface of the polymer. The crosslinking can occur over a depth of less than 100 nm, usually only to a depth of 5 to 50 nm, with the quasi-amorphous zone extending from 100 to 1000 nm in depth. This surface zone characterization for the polyester and polyfluorene polyester materials is unique and can provide improved abrasion resistance.

EXAMPLES

The majority of examples to follow exemplify using the puffed accelerated coaxial plasma gun with stationary samples. However, it will be recognized by those skilled in the art that the accelerated plasma pulses can be used to treat continuous lengths of material by advancement of the material through a targeted area as shown in Example 62. The accelerated coaxial plasma gun would be operated in a repeat pulse mode while the sample to be treated would be moved either step-wise or continuously into the path of the plasma pulses. The timing of the system would be varied such that any area of sample receives one or more pulses. Processing speeds of 400 feet/minute (130 m/minute) or greater can be obtained by pulsing the plasma at rates of only 10 times per second. Wide widths could be treated using a gun of larger dimensions or multiple guns in parallel.

The following test procedures were used in all of the examples unless otherwise specified.

Plasma power measurement: The front of a Gentec ED-550 pyroelectric calorimeter was masked to a 0.23 cm$^2$ aperture using razor blades. This power meter was placed at the center line of the travel path of the plasma, 79 cm from the muzzle of the gun. The energy of the plasma accelerator's 100 uF capacitor was changed by the charge voltage. Energy measurements averaged over 10 pulses were 0.55, 0.67, 0.78, 0.90 and 1.02 J/cm$^2$ at capacitor voltages of 5, 5.5, 6, 6.5, and 7 kV, respectively. This calibration curve was then used to calculate the plasma energy striking the samples being treated.

Film thickness: Thickness measurements were made with an Ono Sokki Co. Ltd. (Japan) model EG-225 gauge.

Examples of Polymer Etching

Example 1

A three mil (0.076 mm) thick stainless steel stencil having 2 to 4 mm wide openings was placed in contact with a 7×17 cm sample of 54 micrometer thick skived polytetrafluoroethylene (PTFE) film. The film was exposed through the stencil to 500 pulses of plasma (0.2 pulses per second) at an energy density of 1.1 J/cm$^2$/pulse. 25±4 micrometers of the PTFE was etched in the open areas of the stencil. This demonstrates that PTFE can be etched with the pulsed plasma to generate relief structures.

Example 2

The linearity of the rate of etching as a function of the number of plasma pulses was measured for PTFE. Using the same plasma conditions and polymer film as described in Example 1, three 7.5×40 cm sections of film were exposed to an increasing number of pulses. The etch depth was measured to be 6, 14, and 27 micrometers for 100, 250, and 500 pulses respectively. From this result, the etching rate is constant at 54 nm per pulse.

Example 3

The rate of etching was measured as a function of plasma energy. The samples and conditions were the same as described in Example 2, only 500 pulses were used and the plasma energy was varied. The etching rate at 0.7, 0.93, and 1.1 J/cm$^2$ was 22, 40, and 60 nanometers per pulse, respectively. Hence, the etching rate increases disproportionately at higher energy densities.

Example 4

Using the polymer film and plasma conditions described in Example 1, holes were plasma etched into PTFE. A sample of PTFE was vapor coated with 50 nm of Cu as a conductive layer. An Archer TM resist decal, number 276-1577 with 5 mil (0.13 mm) diameter holes was applied to the film, and the laminate was exposed to 1000 pulses of plasma. The decal was removed with solvent, and SEM's were taken of the structure. A 5 mil (0.13 mm) diameter hole was produced in the film by the exposure to the plasma. The wall of the hole was smooth and appeared free of any structure due to the etching process itself.

Example 5

A sample of ½ inch (1.27 cm) wide 3M brand 92 polyimide tape was exposed on the polyimide side to accelerated plasma pulses under the same conditions as described in Example 1. 10 micrometers of the original 46 micrometer total thickness of the polyimide was etched by the process. The polyimide was covered with a loosely bound layer of carbon. This demonstrates that accelerated plasma can effectively etch polyimide to form relief structures or vias in thin film.

Examples of Polymer Melting

Example 6

A sample of 110 micrometer thick porous nylon film, Polyamide 6 ID from Akzo Corp., with average pore size of 0.1 micron, was exposed to 1 pulse of argon plasma at an energy density of 1.37 J/cm$^2$/pulse. SEM micrographs showed the surface pores of the film to be partially closed to a depth of 1 micron.

Example 7

A sample of 127 micrometer thick unoriented porous polypropylene film, made according to U.S. Pat. No. 4,726,989, with average pore size of less than 0.1 micron, was exposed to 1 pulse of argon plasma at an energy density of 1.37 J/cm$^2$/pulse. SEM micrographs showed the surface pores of the film closed to a depth of 0.75 to 1.0 microns.

Example 8

A sample of 125 micrometer thick unoriented porous polyethylene film, made according to U.S. Pat. No. 4,539,256, with average pore size of less than 0.1 micron, was exposed to 1 pulse of argon plasma at an energy density of 1.37 J/cm$^2$/pulse. SEM micrographs showed the surface pores of the film closed to a depth of 1.5 microns.

Examples of Creating Quasi-Amorphous Surfaces

Example 9

4 mil (0,102 mm) thick biaxially oriented PET with no slip agents from 3M Co. was exposed to one accelerated argon plasma pulse, at an energy density of 0.16 J/cm$^2$/pulse. The reflectivity of this film as well as an untreated PET film was measured, using an integrating sphere optical configuration, with a Lambda 9 spectrophotometer from Perkin Elmer over the wavelength range of 300–1000 nm. These measurements showed that a broad decrease in reflectivity occurred on accelerated plasma exposure of the PET which is indicative of an outermost layer of a quasi-amorphous material.

Example 10

4 mil (0.102 mm) thick biaxially oriented PET film as used in Example 9 was exposed to 1 accelerated helium plasma pulse at an energy density of 0.55 J/cm$^2$/pulse. The reflectivity of this sample exhibited interference fringes in the region 300–1000 nm. From the spacing of the interference fringes the thickness of the amorphous layer produced on accelerated plasma exposure was estimated to be 800–900 nm. This accelerated plasma treated PET was also examined by ATR spectroscopy (KRS-5 reflection element at 45 degrees angle of incidence) in the wavelength region 6250–7692 nm. From the decrease in peak absorbance of the crystalline absorption band of PET at 7463 nm the thickness of the amorphous layer produced by accelerated plasma exposure was calculated to be 835 nm. In both estimates of the amorphous film thickness the refractive index of the amorphous layer produced by accelerated plasma treatment was assumed to be 1.55.

Example 11

Extrusion cast PET from 3M resin ER662000 was dissolved in o-chlorophenol and spin coated on a 75 mm diameter polished silicon wafer metallized with 100 nm of e-beam evaporated gold. The cast PET film was thermally crystallized in vacuum at 175° C. for 2 hours. After crystallization the film had a thickness of 71 nm. The PET film was then exposed to 1 accelerated argon plasma pulse with an energy density of 0.42 J/cm$^2$/pulse. Depth profiling of this film by IR spectroscopy indicated that the top 33 nm of this film had been amorphized by this exposure. The IR depth profiling procedure is described in U.S. Pat. No. 4,822,451 (Ouderkirk et al.). Samples of this accelerated plasma treated PET thin film were then exposed to chloroform vapor and examined by IR reflection-absorption spectroscopy (also described in U.S. Pat. No. 4,822,451). An absorption band at 13175 nm in these IR spectra indicated the presence of chloroform trapped in the accelerated plasma amorphized layer on the surface of the PET film. Although the chloroform slowly diffused out of the treated PET at room temperature, IR spectra indicated that 27% of the chloroform remained in the thin film 1140 hours after initial exposure, thus showing the barrier properties of the treated film.

Example 12

PET film number OR478400 from 3M Co. was dissolved in o-chlorophenol and spin coated on a 75 mm diameter polished silicon wafer, thus producing an amorphous PET sample. This sample was then exposed through a stainless steel template to 1 accelerated argon plasma pulse with an energy density of 2.0 J/cm$^2$/pulse. The treated areas developed a dark blue image of the template. The sample was then dipped in methylene chloride to dissolve the amorphous PET, and the template pattern showed up clearly, confirming the accelerated plasma pulse converted the amorphous PET into a crosslinked structure which was insoluble in the solvent.

Examples of Improved Coating Adhesion

Example 13

4 mil (0.102 mm) thick biaxially oriented PET film as used in Example 9 was exposed to 1 accelerated argon plasma pulse at an energy density of 0.42 J/cm$^2$/pulse. The treated film was then metallized with an 80 nm thick electron beam evaporated silver film. The effect of the accelerated plasma amorphization of the PET prior to metallization on adhesion was determined by performing a number of 180° peel tests on untreated and accelerated plasma treated areas of the metallized PET. The peel tests were done at a peel rate of 6 inches/min (13.2 cm/minute) using an Instrumentors, Inc. Model SP 101A slip/peel tester with 1 inch (2.54 cm) wide strips of Kapton TM tape attached to the metallized film samples. The tape used for these measurements was coated with a thermoplastic polyamide adhesive (Union Camp Uni-rez TM 2645). In attaching the tape to the metallized PET the samples were exposed to temperatures in the range of 70°–90° C. for 5–10 seconds. The average peel force required to remove the Ag from the untreated PET was 70 g/in. (27.6 g/cm). The average peel force measured during the testing of the accelerated plasma treated areas was 602 g/in. (237 g/cm). In addition, the metal could not be removed from the accelerated plasma treated areas by the testing procedure used here. This indicates at least an 8.6 times increase in Ag film adhesion due to the presence of the accelerated plasma amorphized PET film on the surface.

Example 14

5 mil (0.127 mm) thick polytetrafluoroethylene film was exposed to 1 accelerated argon plasma pulse at an energy density of 0.15 J/cm$^2$/pulse. An 80 nm thick Al film was then electron beam evaporated on the treated polymer film. The effect of the accelerated plasma exposure prior to metallization on the Al adhesion was determined by peeling 1 inch (2.54 cm) wide strips of the metallized polymer off of Number 966 DS4 pressure sensitive adhesive from 3M Co. that had been transferred to strips of 10 mil (0.254 mm) thick aluminum sheet. The average peel force required to remove the Al from untreated areas of the film was 412 g/in. (162 g/cm). In the accelerated plasma treated areas the average peel force increased to 911 g/in. (359 g/cm) and the Al was only incompletely removed from the teflon indicating that the Al adhesion had increased by at least a factor of 2.2 times.

Example 15

2 mil (0.051 mm) thick biaxially oriented polypropylene film (BOPP) number TX-200-2-C from Trea Industries was exposed to 1 accelerated argon plasma pulse at an energy density of 0.42 J/cm$^2$/pulse. An 80 nm thick Al film was then electron beam evaporated on the treated polymer film. The effect of the accelerated plasma exposure prior to metallization on the Al adhesion was determined as in Example 14. In the untreated areas of the Al/BOPP, the average peel force required to remove the Al was 641 g/in. (252 g/cm). The average peel force increased to 1621 g/in. (638 g/cm) in the treated areas. Again the Al was only incompletely removed by the peel testing in the accelerated plasma treated areas indicating an increase in Al adhesion by a factor of at least 2.5 times.

Example 16

4 mil (0.1 mm) thick biaxially oriented PET was exposed to 1 accelerated helium plasma pulse with an energy density of 0.55 J/cm$^2$/pulse. 100 nm thick Al films were then electron beam evaporated on treated and untreated PET films. The effect of the accelerated plasma exposure prior to metallization on the Al adhesion was determined as in Example 13. In the untreated areas the average peel force required to remove the Al from the polymer was 37 g/in. (14.6 g/cm). In the accelerated plasma treated areas the average peel force increased to 132 g/in. (52 g/cm) and the Al was not removed from the polymer indicating that the Al adhesion had increased by at least a factor of 3.6 times on accelerated plasma treatment of the PET.

Examples 17-21

2 mil (0.051 mm) thick BOPP was metallized with a 00 nm thick film of electron beam evaporated Al. Pieces of this Al metallized BOPP were then exposed to accelerated argon plasma pulses over a range of plasma energies. The effect of this accelerated plasma treatment on the Al adhesion was determined as in Example 14. The results are listed in Table 1.

TABLE 1

| Example | Plasma Energy (J/cm$^2$) | Peel Strength (g/in) | (g/cm) |
|---|---|---|---|
| 17 | 0.0 | 417 | 164 |
| 18 | 0.1 | 378 | 149 |
| 19 | 0.3 | >1739 | >685 |
| 20 | 0.6 | >1728 | >680 |
| 21 | 0.8 | >1535 | >604 |

For all samples exposed to plasma pulses with an energy density equal to or greater than 0.3 J/cm$^2$, the Al could not be removed from the BOPP with the peel test procedure used here, indicating that the peel strengths listed above are only lower limits for the actual values.

Example 22

4 mil (0.102 mm) thick polytetrafluoroethylene film was exposed to 2 pulses of accelerated argon plasma with an energy density of 0.085 J/cm$^2$/pulse. The effect of the accelerated plasma treatment on the adhesion of pressure sensitive adhesives to the surface was evaluated by 180° peel tests. 1 inch (2.54 cm) wide strips of a high tack adhesive tape number 622 from 3M Co. were peeled from treated and untreated areas of the film. The treated samples had an average peel force of 2221 g/in. (874 g/cm), while untreated samples had an average peel force of 213 g/in. (84 g/cm) resulting in a ten fold increase in adhesion properties.

Examples of Etching of Applied Coatings

Various polymer samples with nonmetal oxide and metal thin film coatings were surface treated by exposure to accelerated plasma pulses. The plasma pulses were fired at the sample target located 79 centimeters downstream. The energy density incident on the sample surface was varied from 73 to 980 mJ/cm$^2$ per pulse with a pulse to pulse reproducibility of ±12%. The process was operated at pressures of 0.15 mtorr or less and used He (90 psi) as the process gas.

Removal of the thin film coating, without extensive damage to the underlying substrate, was observed on samples receiving plasma pulses at an energy flux equal to or greater than a critical threshold. This threshold varied depending upon the coating material and thickness as well as substrate type.

Selective thin film removal can be done by masking the sample from the plasma pulse using either a noncontact method such as a stencil or the direct contact application of a thin coating to the sample surface. All samples were masked with a thin (approximately 1/16 inch [1.59 mm] wide) felt-tip marker line drawn vertically down the center of the sample area.

The effect of the accelerated plasma pulse to image by selective thin film removal was measured by line resolution. Resolution was defined as being the thin film border remaining adjacent to the marker line drawn on the samples. The width of this border was measured using an optical microscope at 450× with a 2.75 micron per division reticule. These values have a relative error of ±20%. The samples all showed the best resolution values at the highest energy used for treatment. This measurement of resolution is an lower limit since the ink line was not perfectly sharp.

Examples 23-27

Cu films were electron beam evaporated to thicknesses of 38, 76, 114, 190 and 380 nm on 4 mil (0.102 mm) thick biaxially oriented PET film (3M Co.). Samples of each Cu thickness were treated by exposure to 1 accelerated helium plasma pulse at each of the following energy densities (73, 172, 325, 450, 570, 640, 820, 930, and 980 mJ/cm$^2$). The threshold for Cu removal occurred at an energy density of 325 mJ/cm$^2$ for the three thinnest Cu films and at 640 mJ/cm$^2$ for the 190 and 380 nm films. The best imaging was observed at the highest energy density tested, 980 mJ/cm$^2$, with resolutions varying from 41 microns on the 38 nm Cu film to 127 microns on the 380 nm film. The results are shown in Table 2.

TABLE 2

| Example | Copper Thickness (nm) | Metal Etching Results | |
|---|---|---|---|
| | | Threshold Energy Density (mJ/cm$^2$) | Highest Resolution (microns) |
| 23 | 38 | 325 | 41 |
| 24 | 76 | 325 | 48 |
| 25 | 114 | 325 | 55 |
| 26 | 190 | 640 | 72 |
| 27 | 380 | 640 | 127 |

Experimental observation suggested that the mechanism for metal etching by accelerated pulsed plasma treatment was partially a result of delamination between the substrate and its thin film layer. Therefore, copper etching was studied on various polymer films which were known to have differing adhesion to copper. The substrates included a range of commodity polymers commonly vapor or sputter coated.

Examples 28-32

Cu films were electron beam evaporated on 2 mil (0.051 mm) thick biaxially oriented polypropylene film (BOPP) as in Example 16, to the same thicknesses and received the same treatment as Examples 23 to 27. As predicted by qualitative adhesion comparisons, copper was etched at lower energy densities on BOPP than on PET. All samples exhibited lower threshold and improved resolution values at equivalent Cu thicknesses. The results are shown in Table 3.

TABLE 3

| Example | Copper Thickness (nm) | Threshold Energy Density (mJ/cm$^2$) | Metal Etching Results | |
|---|---|---|---|---|
| | | | Maximum Energy Density (mJ/cm$^2$) | Highest Resolution (microns) |
| 28 | 38 | 172 | 930 | 8 |
| 29 | 76 | 325 | 930 | 22 |
| 30 | 114 | 325 | 820 | 22 |
| 31 | 190 | 450 | 980 | 41 |
| 32 | 380 | 570 | 980 | 77 |

Examples 33-37

Pieces of 2 mil (0.054 mm) thick low density polyethylene (LDPE) number SF-30 from Consolidated Thermoplastics Co., Arlington Heights, Ill., were deposited with thin films of electron beam evaporated Cu. The samples received the same coating thicknesses and treatment as Examples 23-27. This system exhibited image resolution values similar to those of Examples 28-32 (Cu/BOPP) despite significantly higher threshold values for metal etching. The threshold values measured were comparable to those for copper on PET. The highest resolution was obtained at an energy density greater than this threshold and was at 980 mJ/cm$^2$ in these examples. Table 4 lists the measured values along with their associated Cu thicknesses.

TABLE 4

| Example | Copper Thickness (nm) | Metal Etching Results | |
|---|---|---|---|
| | | Threshold Energy Density (mJ/cm$^2$) | Highest Resolution (microns) |
| 33 | 38 | 325 | 11 |
| 34 | 76 | 325 | 14 |
| 35 | 114 | 325 | 19 |
| 36 | 190 | 325 | 28 |
| 37 | 380 | 570 | 63 |

Examples 38-42

A series of copper metallized polyimide films were treated to include a system with high metal/polymer adhesion properties relative to the previous examples and to demonstrate etching on a thermoset substrate. Similarly to Examples 23-27, Cu films were electron beam evaporated on 2 mil (0.054 mm) thick PI film (pyromellitic dianhydride/oxydianiline). As predicted, Cu/PI was the most difficult in the series to image. The threshold energy density required was almost double that of any other system. The highest resolution was obtained at an energy density greater than this threshold and was at 980 mJ/cm$^2$ in these examples. In addition, imaging to within a specification of <100 microns was limited to thicknesses of 114 nm. These results are shown in Table 5.

TABLE 5

| Example | Copper Thickness (nm) | Threshold Energy Density (mJ/cm$^2$) | Highest Resolution (microns) |
|---|---|---|---|
| 38 | 38 | 640 | 55 |
| 39 | 76 | 570 | 93 |
| 40 | 114 | 640 | 99 |
| 41 | 190 | 640 | 187 |
| 42 | 380 | 820 | 181 |

Examples 43-47

Ag, Al, Ni, Cr and SiO$_2$ thin films were electron beam evaporated to a thickness of 80 nm on 4 mil (0.102 mm) thick biaxially oriented PET from 3M Co. The samples were treated as previously described for Examples 23-27. This was done to quantify the effect of differing thin film types. The thickness of 80 nm was selected as being a typical depth requiring metal etching. These samples can be compared to Example 24.

The inorganic SiO$_2$ was expected to have the lowest adhesion to PET and was demonstrated to be the easiest system to image. The most difficult system was Cr/PET which required a threshold energy almost 3 times greater than the others studied and had the lowest resolution of the metals tested. The highest resolution was obtained at an energy density greater than this threshold and was at 980 mJ/cm$^2$ in these examples. The results for all five systems are summarized in Table 6.

TABLE 6

| Example | Coating | Metal Etching Results | |
|---|---|---|---|
| | | Threshold Energy Density (mJ/cm$^2$) | Highest Resolution (microns) |
| 43 | Al | 325 | 28 |
| 44 | Ni | 325 | 55 |
| 45 | Cr | 930 | 94 |
| 46 | Ag | 325 | 38 |

TABLE 6-continued

| Example | Coating | Metal Etching Results | |
|---|---|---|---|
| | | Threshold Energy Density (mJ/cm$^2$) | Highest Resolution (microns) |
| 47 | SiO$_2$ | 325 | 19 |

Example 48

A 65–70 nm Ag film was electron beam evaporated on 7 mil (0.18 mm) thick PET film from 3M Co. The Ag film was then printed with Cavcure 2-Process Black UV cure ink from Cavanagh Corporation, Flemington, N.J., to produce a grid pattern of 30 micron lines with 10 mil (0.254 mm) center-to-center spacing. The sample was exposed to one argon accelerated plasma pulse at an energy density of 1.4 J/cm$^2$. The untreated sample had a conductivity of 4.4 mhos per square measured by an LEI Model 1010 Contactless Conductivity Probe from Lehighton Electronics, Inc., of Lehighton, Pa., and a transmission of <1% at a wavelength of 550 nm measured by a Lambda 9 UV/VIS/NIR Spectrophotometer, by Perkin Elmer Co. The imaged sample displayed a 1.5 mhos per square conductivity but at a transmission of 52%. The line resolution was measured to be 5 microns by optical microscopy techniques as previously described.

Example 49

An Al thin film was electron beam evaporated to a thickness of 30–35 nm on 1.6 mil (0.041 mm) thick biaxially oriented polypropylene (BOPP) from 3M Co. The Al film was then printed with Cavcure TM 2-Process Blue UV curable ink in a 50% screen pattern with 125 lines per inch (49 lines/cm) spacing. The sample was treated as in Example 48 but at an energy density of 900 mJ/cm$^2$. The unmasked metal was removed by the exposure to the plasma pulse to reproduce an imaged metallic half-tone.

Example 50

50–100 nm thick aluminum was electron beam evaporated on a 3 mil (0.076 mm) nonwoven substrate (3M Sasheen ribbon). The Al film was then printed on with a solvent based ink in a pattern containing, 0.25 mm minimum line widths and dot diameters. The sample was exposed to one accelerated He plasma pulse at an energy density of 3.3 J/cm$^2$. The treatment selectively removed the non-ink covered Al coating reproducing the printed image.

Examples 51–59

As previously mentioned, selective thin film removal can be done by masking the sample from the plasma. All prior examples described the use of a surface coating. A sample can also be masked using the shadow of a stencil. As previously described in Example 23, a sample was prepared by depositing 38 nm of Cu on PET and then was treated with 1 accelerated helium plasma pulse through a 1 cm high by 2.54 cm wide aperture placed 4–5 mm in front of the sample. Table 7 lists the area demetallized at each of the treated energy densities.

TABLE 7

| Example | Energy Density (mJ/cm$^2$) | Demetallized Dimensions | |
|---|---|---|---|
| | | Width (mm) | Height (mm) |
| 51 | 73 | — | — |
| 52 | 172 | — | — |
| 53 | 325 | 23.5 | 7.75 |
| 54 | 450 | 23.75 | 9.25 |
| 55 | 570 | 23.75 | 9.0 |
| 56 | 640 | 23.75 | 9.0 |
| 57 | 820 | 24.5 | 9.25 |
| 58 | 930 | 24.75 | 9.75 |
| 59 | *980 | 25.0 | 10.0 |

*sample showed nearly squared corners (all others rounded)

Example 60

30–35 nm of aluminum was electron beam evaporated on 1.6 mil (0.041 mm) thick biaxially oriented polypropylene (BOPP) from 3M Co. The Al side was then printed with Cavcure 2-Process Green UV curable ink to produce a pattern with 3 point numerals with 5 mil (0.127 mm) wide lines. The printed metallic film was subsequently vapor-coated with an additional 100 nm of Al. The sample was exposed to one accelerated helium plasma pulse at an energy density of 520 mJ/cm$^2$. The Al remained on the areas that were ink printed. The Al film that was deposited on the metallized surface was etched down through to the underlying polymer substrate. This demonstrates the ability to selectively remove thin films by accelerated plasma treatment due to differences in surface adhesion.

Example 61

1.2 mil (0.03 mm) thick BOPP from 3M Co. was printed with Suncure #5 process blue UV curable ink from GPI, to produce a pattern of 6 mil circular lines and spaces. The ink side was deposited with 100 nm of electron beam evaporated aluminum. The metallized film was then exposed to one accelerated argon plasma pulse at an energy density of 0.12 J/cm$^2$. This treatment selectively removed the aluminum from the BOPP where there was no ink printing. This demonstrates the ability to selectively remove thin film coatings with accelerated plasma by varying the threshold energy for demetallization of the sample rather than by blocking the plasma with a mask.

Example 62

A 30–35 nm aluminum film was electron beam evaporated onto a continuous 6 inch wide roll of 1.6 mil (0.041 mm) BOPP from 3M Co. The metallized film was printed using Cavcure 2 process yellow UV curable ink to produce a pattern of multiple line widths of 0.07 to 4 mm. The sample roll was inserted in a web handling system in the vacuum chamber. The drive roll of the system was connected to a computer controlled Parker series 2100 Compumotor, which drove the web at a constant rate of 6.25 ft/min (190 cm/minute) at a distance of 36 cm from the gun. The coaxial plasma gun was operated in a repeat pulse mode of 1.9 seconds/pulse and was timed to treat the sample through a 6.3 cm high by 16.4 cm wide aperture with less than 0.3 cm overlap. Each pulse had an energy density of 0.8 J/cm$^2$. A 6 meter length of material exposed to the accelerated plasma pulses was shown to reproduce the printed pattern across the entire web, thus demonstrating the use of the coaxial plasma gun for continuous processing. This process is useful on any polymeric surface, whether semicrystalline or not. Polyimide substrates are particularly desirably used in this process.

Example 63

65 micron average diameter glass beads with a 500 to 1000 A coating of silver were prepared according to standard wet silver plating techniques. A layer of these beads were adhered to the surface of a PET film with 3M Shipping-Mate labeling adhesive. The bead layer was then exposed to 1 pulse of accelerated argon plasma at an energy density of 4.08 J/cm$^2$. The top half of the silver on the beads was etched off, leaving a very good retroreflector.

Example of Sintering of Organic Dispersions

Example 64

A thin film of fluorinated ethylene propylene dispersion (DuPont FEP 120) was coated on 4 mil (0.102 mm) thick biaxially oriented PET film and was exposed to 1 accelerated helium plasma pulse with an energy density of 0.32 J/cm$^2$/pulse. SEM examination of untreated and accelerated plasma treated areas of the teflon film showed that the accelerated plasma had sintered the teflon particles (approximately 100-150 nm diameter) into a smooth, continuous film (i.e., no detectable individual particles after accelerated plasma exposure).

We claim:

1. A process for modifying a polymeric surface comprising projecting either pulses or a scanned beam of ions or plasma having a molecular weight of at least 1 against a polymeric surface at a fluence of $10^{-3}$ to $10^3$ J/cm$^2$ at a pressure less than 0.8 bar with an effective pulse duration of 10 nanoseconds to 1 millisecond, said projecting etching said polymeric surface or adding chemistry to said polymeric surface.

2. The process of claim 1 wherein said pressure is less than 0.4 bar.

3. A process for modifying a polymeric surface comprising projecting either pulses or a scanned beam of ions or plasma having a molecular weight of at least one against a polymeric surface at a fluence of $10^{-3}$ to $10^3$ J/cm$^2$ at a pressure less than 0.8 Bar with an effective pulse duration of 10 nanoseconds to 1 millisecond, said projecting etching said polymeric surface or adding chemistry to said polymeric surface, wherein said pressure is less than 0.05 Bar.

4. The process of claim 1 wherein said fluence and the number of pulses is sufficiently high so that at least a portion of said surface is ablated.

5. The process of claim 3 wherein said fluence and the number of pulses is sufficiently high so that at least a portion of said surface is ablated, and the duration of said pulse is between 10 nanoseconds and 100 microseconds.

6. The process of claim 1 wherein said surface comprises an organic semicrystalline polymer and wherein said fluence and number of pulses converts at least a portion of said surface to a quasi-amorphous state.

7. The process of claim 3 wherein said surface comprises an organic semicrystalline polymer and wherein said fluence and number of pulses converts at least a portion of said surface to a quasi-amorphous state.

8. The process of claim 1 wherein said surface comprises a polymer selected from the group consisting of polyethylene terephthalate or fluorene polyester and the pulses cause crosslinking of said polymer.

9. The process of claim 3 wherein said surface comprises a polymer selected from the group consisting of polyethylene terephthalate or fluorene polyester and the pulses cause crosslinking of said polymer.

10. The process of claim 1 wherein said ions or plasma are projected through a mask.

11. The process of claim 3 wherein 0.1 to 10 micrograms/cm$^2$ of material from said ions or plasma is deposited into said surface by said pulses.

12. The process of claim 4 wherein said ions or plasma are projected through a mask.

13. The process of claim 5 wherein 0.1 to 10 micrograms/cm$^2$ of material from said ions or plasma is deposited into said surface by said pulses.

14. The process of claim 6 wherein said ions or plasma are projected through a mask.

15. The process of claim 7 wherein 0.1 to 10 micrograms/cm$^2$ of material from said ions or plasma is deposited into said surface by said pulses.

16. The process of claim 1 wherein said ions or plasma are projected through a mask against an organic polymeric surface.

17. The process of claim 1 wherein after projecting pulses of ions or plasma against said polymeric surface a metal layer is deposited onto said polymeric surface.

18. The process of claim 6 wherein after projecting pulses of ions or plasma against said polymeric surface a metal layer is deposited onto said polymeric surface.

19. The process of claim 11 wherein after projecting pulses of ions or plasma against said polymeric surface a metal layer is deposited onto said polymeric surface.

20. A process for modifying a polymeric surface comprising projecting either pulses or a scanned beam of ions or plasma having a molecular weight of at least 1 against a polymeric surface at a fluence of $10^{-3}$ to $10^3$ J/cm$^2$ at a pressure less than 0.8 bar with an effective pulse duration of 10 nanoseconds to 1 millisecond, wherein after projecting pulses of ions or plasma against said polymeric surface a metal layer is deposited onto said polymeric surface and wherein said metal layer is removed from said polymeric surface at least in some areas upon which pulses of ions or plasma have not been projected.

21. The process of claim 18 wherein said metal layer is removed from said polymeric surface at least in some areas upon which pulses of ions or plasma have not been projected.

22. The process of claim 19 wherein said metal layer is removed from said polymeric surface at least in some areas upon which pulses of ions or plasma have not been projected.

23. A process for modifying a surface selected from the group consisting essentially of organic polymers, glasses, ceramics, and metals, said process comprising projecting ions or plasma having a molecular weight of at least 1 as 1 to 20 effective pulses or beams against said surface at a fluence of 1 mJ/cm$^2$ to $10^3$ J/cm$^2$ at a pressure less than 0.8 Bar with an effective pulse duration of 10 nanoseconds to 1 millisecond.

24. A process for modifying a surface, said process comprising projecting ions or plasma as 1 to 20 effective pulses or beams against said surface at a fluence of 1 mJ/cm$^2$ to $10^3$ J/cm$^2$ at a pressure less than 0.8 Bar with an effective pulse duration of 10 nanoseconds to 1 millisecond, wherein said surface comprises a glass and said glass is etched or ablated by said ions or plasma.

25. A process for modifying a surface, said process comprising projecting ions or plasma as 1 to 20 effective pulses or beams against said surface at a fluence of 1 mJ/cm² to 10³ J/cm² at a pressure less than 0.8 Bar with an effective pulse duration of 10 nanoseconds to 1 milliseconds, wherein said surface comprises a ceramic and said ceramic is etched or ablated by said ions or plasma.

26. The process of claim 23 wherein said surface comprises a metal and said metal is etched or ablated by said ions or plasma.

27. A process for modifying a metal, said process comprising projecting ions or plasma having a molecular weight of at least 1 as 1 to 20 effective pulses or beams against said surface at a fluence of 1mJ/cm² to 10³ J/cm² at a pressure less than 0.8 Bar with an effective pulse duration of 10 nanoseconds to 1 millisecond, wherein said surface of said metal is etched or ablated by said ions or plasma and wherein said metal comprises a metal layer of 1 to 500 nm on a polymer.

28. The process of claim 1 wherein said polymeric surface comprises a porous material in which at least some pores are closed or skinned by the action of said ions or plasma.

29. The process of claim 28 wherein said polymeric surface comprises an open cell foam on which a skin is formed by projection of said ions or plasma.

30. The process of claim 1 wherein said ions are projected by a coaxial plasma accelerator.

31. The process of claim 5 wherein said ions are projected by a coaxial plasma accelerator.

32. The process of claim 7 wherein said ions are projected by a coaxial plasma accelerator.

33. The process of claim 11 wherein said ions are projected by a coaxial plasma accelerator.

34. The process of claim 17 wherein said ions are projected by a coaxial plasma accelerator.

35. The process of claim 1 wherein said polymer comprises a synthetic organic polymer and after said treatment said polymer surface is bonded to another material.

36. The process of claim 35 wherein said bonding is effected by applying a coating to said surface.

37. A process for modifying a polymeric surface comprising projecting either pulses or a scanned beam of ions or plasma having a molecular weight of at least 1 against a polymeric surface at a fluence of $10^{-3}$ to $10^3$ J/cm² at a pressure less than 0.8 Bar with an effective pulse duration of 10 nanoseconds to 1 millisecond, said projecting etching said polymeric surface or adding chemistry to said polymeric surface, wherein a coating is present on said polymer surface during said treatment and the adhesion of said coating to said polymer surface is increased by said treatment.

38. The process of claim 37 wherein said coating comprises a metal and said polymer comprises a synthetic organic polymer.

* * * * *

UNITED STATES PATENT AND TRADEMARK OFFICE
CERTIFICATE OF CORRECTION

PATENT NO. : 5,389,195
DATED : February 14, 1995
INVENTOR(S) : Ouderkirk et al.

It is certified that error appears in the above-indentified patent and that said Letters Patent is hereby corrected as shown below:

Column 11, line 33, delete "(0,102 mm)" and insert --(0.102 mm)--.

Column 13, line 59, delete "00 nm" and insert --100 nm--.

Signed and Sealed this

Fourth Day of July, 1995

*Attest:*

BRUCE LEHMAN

*Attesting Officer*     *Commissioner of Patents and Trademarks*